UNITED STATES PATENT OFFICE.

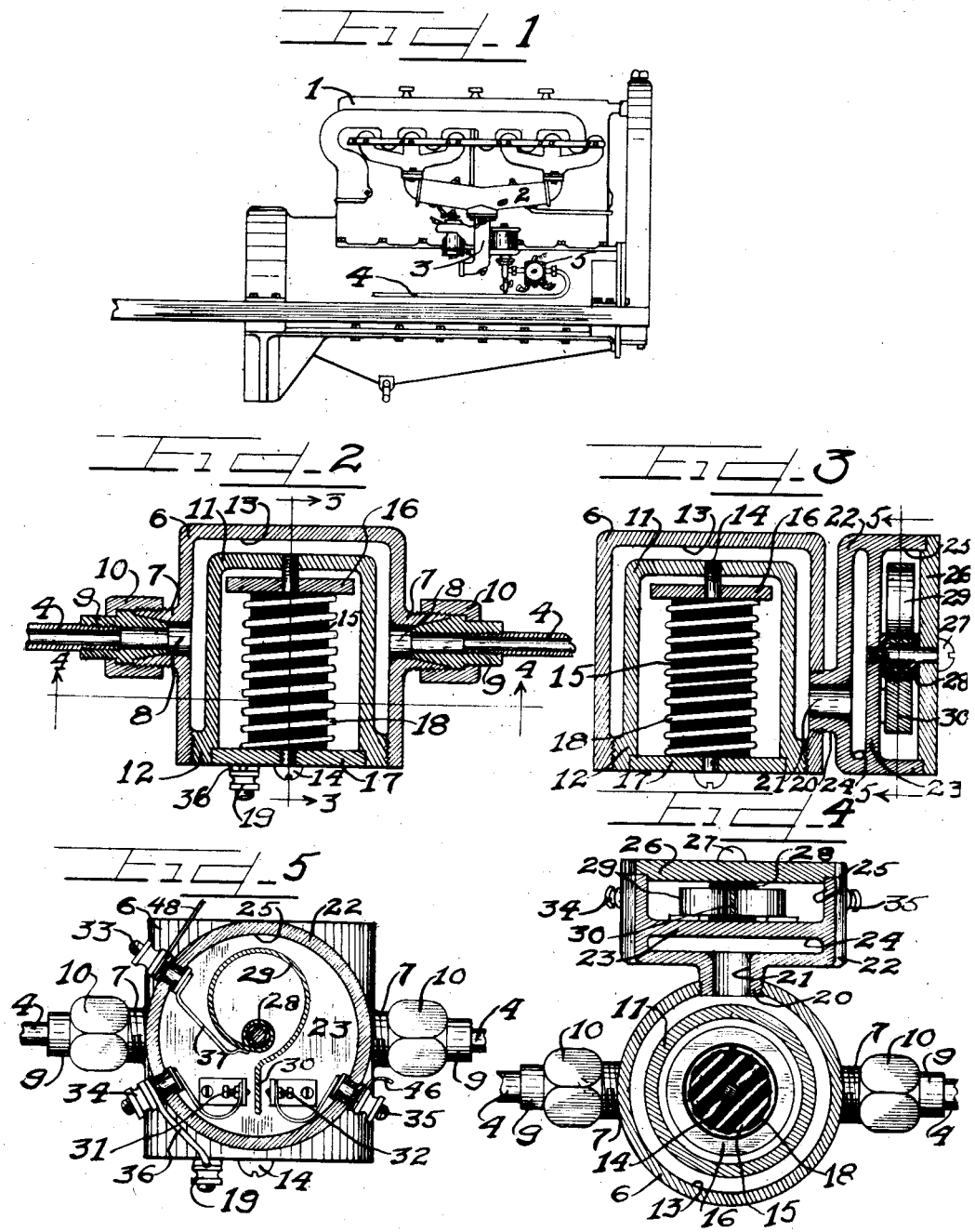

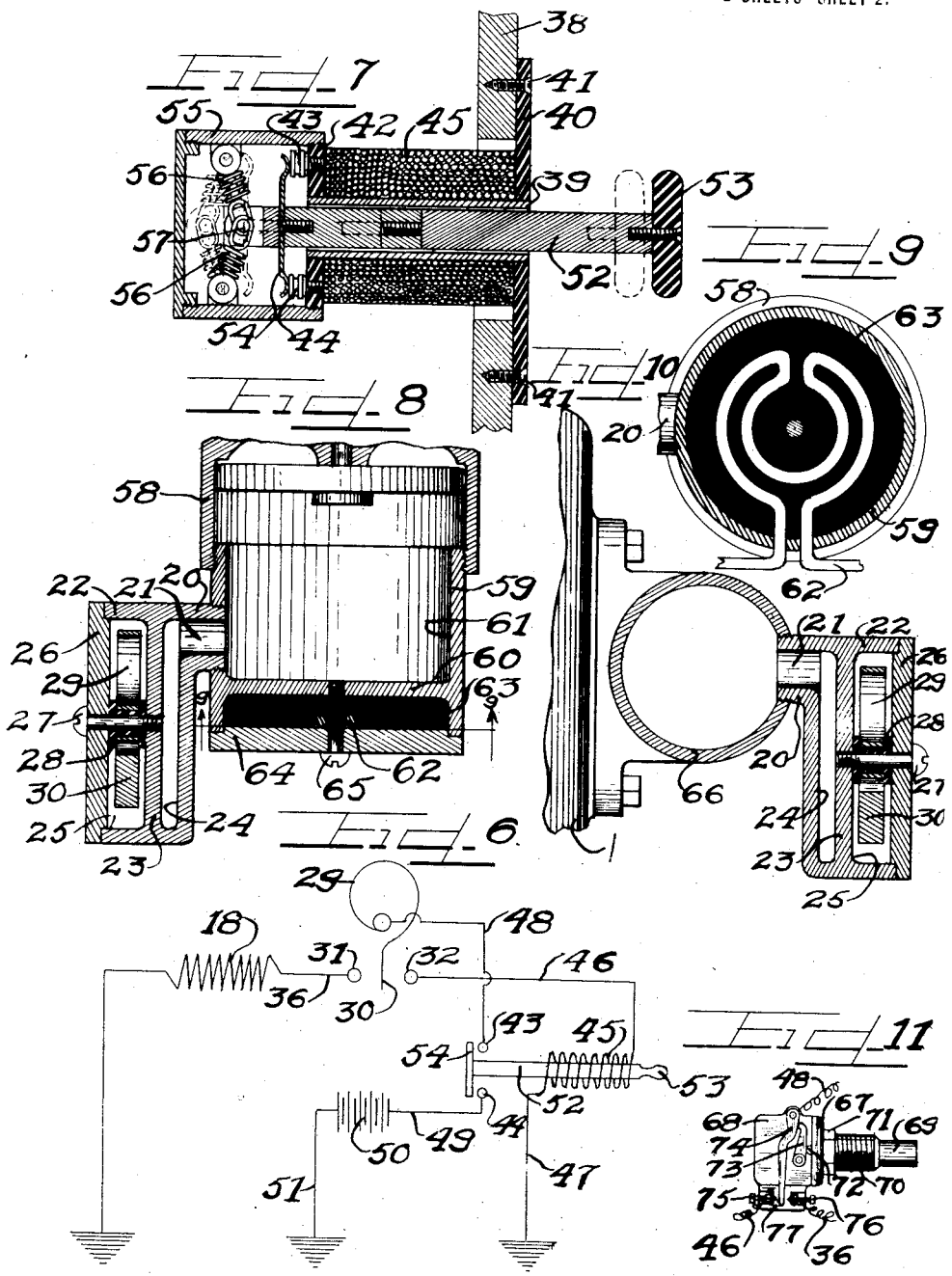

LEWIS H. LAMONT, OF CHICAGO, ILLINOIS.

THERMOSTATIC CONTROL MECHANISM FOR HYDROCARBON-ENGINES.

1,350,871.

Specification of Letters Patent.   Patented Aug. 24, 1920.

Application filed November 30, 1917. Serial No. 204,544.

*To all whom it may concern:*

Be it known that I, LEWIS H. LAMONT, a citizen of the United States, and a resident of the city of Chicago, in the county of Cook and State of Illinois, have invented certain new and useful Improvements in a Thermostatic Control Mechanism for Hydrocarbon-Engines; and I do hereby declare that the following is a full, clear, and exact description of the same, reference being had to the accompanying drawings, and to the numerals of reference marked thereon, which form a part of this specification.

This invention relates to a thermostatic control mechanism adapted to be automatically operated to regulate the heating or volatilization of gasolene before it is admitted into the mixing chamber of a carbureter.

It is an object of this invention to provide an automatically acting mechanism adapted to thermostatically control the preheating of gasolene before the same is admitted into a carbureter.

Another object of this invention is the construction of a thermostatic control adapted to be connected with a gasolene engine for regulating the preheating of gasolene before it enters the carbureter.

A further object of the invention is the construction of a thermostat adapted to be used in combination with an electric heater and a solenoid switch mechanism for automatically controlling the heating of gasolene before it enters the carbureter of a gasolene engine.

An important object of the invention is the construction of a theremostat control mechanism of simple and effective form for automatically controlling the preheating of gasolene before the same is carbureted with air to be used as a fuel in a hydro-carbon engine.

Other and further important objects of this invention will be apparent from the disclosures in the specification and drawings.

The invention (in a preferred form) is illustrated in the drawings and hereinafter more fully described.

On the drawings:

Figure 1 is an elevational view of one side of an engine equipped with a thermostatic control mechanism embodying the principles of this invention.

Fig. 2 is a central vertical section taken through the device, with parts shown in elevation.

Fig. 3 is a section taken on line 3—3 of Fig. 2, with parts in elevation.

Fig. 4 is a section on line 4—4 of Fig. 2.

Fig. 5 is a section taken on line 5—5 of Fig. 3, with parts shown in elevation.

Fig. 6 is a wiring diagram of the device.

Fig. 7 is a longitudinal vertical section through the solenoid switch mechanism mounted upon the dash of a motor car.

Fig. 8 is a central vertical section through a modified form of thermostat and heater shown associated with the dash pot of a carbureter.

Fig. 9 is a section on line 9—9 of Fig. 8.

Fig. 10 is a central vertical section through a thermostat shown associated with the exhaust manifold of an engine.

Fig. 11 is a side elevational view of another modified form of thermostat.

As shown on the drawings:

The reference numeral 1, designates an automobile engine provided with an intake manifold 2, and having a carbureter 3, attached thereto in the usual manner. Connected with the float chamber of the carbureter 3, is a gasolene supply or feed pipe 4, having connected therein at a point near the carbureter a thermostatically controlled heating unit represented as a whole by the reference numeral 5, and forming a portion of the thermostatic control mechanism embodying the principles of this invention.

As shown in Figs. 2 to 5, inclusive, the thermostatically controlled heating unit comprises a heater and a thermostat. The heater embraces a cylindrical shell or outer casing 6, open and internally threaded at its lower end, and provided on opposite sides thereof with externally threaded collars 7, each of which is provided with an inwardly tapering passage 8, communicating with the interior of said casing. The supply pipe 4, at a point near the carbureter, has a portion thereof cut out, and the adjacent ends of said pipe are externally threaded. Removably threaded on each of the threaded ends of the pipe 4, is a tapered passaged plug 9, adapted to fit into the tapered passage 8, of one of the collars 7. Engaged on each of the plugs 9, is an internally threaded nut, cap or connector 10, which is removably threaded onto one of the sleeves 7, to hold the casing 6, connected in the gasolene supply pipe 4, with the plugs 9, tightly sealed in the passages 8. A housing or inner casing 11, open at its lower end and provided with an externally threaded flange 12, is removably threaded into the outer casing 6. Said inner casing 11, is of a size to afford a gasolene chamber 13, between said casings into which the passages 8, communicate. Removably secured within the inner casing 11, by means of a screw 14, is an electric heater comprising a spool 15, having an inner metal end plate 16, and an outer metal end plate 17, which closes the lower open end of the inner casing. A heating coil 18, is wound on the spool 15, and has one end thereof grounded through the inner end plate 16, while the other end is attached to a binding post 19, secured on the exterior surface of the outer end plate 17.

The outer casing 6, of the heater, is provided with a threaded opening or aperture in the front side thereof, into which is removably threaded a sleeve or collar 20, provided with a passage 21. Said collar 20, is integrally formed on the exterior of the rear wall of a thermostat embracing a cylindrical housing or casing 22, provided on the interior thereof with a transverse partition wall 23, affording a gasolene chamber 24, within the casing 22, between the partition wall and the rear wall, and an open instrument chamber 25, in the fore part of the casing, which is closed by means of a disk or plate 26, which is held in position by a retaining screw 27, which projects through a passaged insulating sleeve 28, and removably threads into the partition wall 23. Said insulation sleeve 28, is rigidly secured centrally on the front face of the partition wall 23, and has secured thereon the inner end of a metal expansion spring 29, the outer end of which is bent at an angle to afford a contact member or lever 30. Mounted within the chamber 25, upon the front surface of the partition wall 23, are adjustable contact terminals 31 and 32, disposed on opposite sides of the contact member 30, as clearly shown in Fig. 5. Mounted on the thermostat casing 22, are three connecting or binding posts 33, 34, and 35, respectively. The contact terminal 31, is connected with the binding post 34, which in turn is connected by a wire 36, to the binding post 19, of the heating coil 18. The contact terminal 32, is connected to the binding post 35, and the binding post 33, is connected with the expansion spring 29, by means of a spring finger 37.

Shown in Fig. 7, is a solenoid switch comprising a part of the thermostat control mechanism. Said solenoid switch is mounted upon the dash or instrument board 38, of the automobile, or in any other suitable place. The solenoid switch comprises a sleeve 39, having a front plate 40, secured on one end thereof which fits flat against the dash 38, and is secured thereto by screws 41. Secured on the other end of the sleeve 39, is a disk or rear plate 42, on which are mounted terminal or contact posts 43 and 44, respectively. Wound upon the sleeve 39, between the plates 40, and 42, is a solenoid coil 45, one end of which is connected by means of a wire 46, through the binding post 35, with the contact terminal 32, while the other end thereof is grounded through a wire 47. The contact post 43, is connected to the expansion spring 29, through the binding post 33, and spring finger 37, by means of a wire 48, and the contact post 44, is connected by means of a wire 49, to batteries 50, or any other suitable source of electrical energy. The batteries 50, are grounded through a wire 51. Slidably projecting through the sleeve 39, is a solenoid core 52, provided with a handle 53, on its outer end and with a two arm contact member 54, on the inner end adapted to be moved to simultaneously contact the terminal posts 43 and 44. Mounted on the inner solenoid plate 42, is a casing 55, within which are pivotally mounted a pair of oppositely disposed spring controlled links 56, the inner ends of which overlap and are slotted to slidably engage a pin 57, secured on the inner end of the solenoid core 52.

Figs. 8 and 9, disclose a modified form of heater to which a thermostat similar to that already described is removably attached. In this form of the device, the reference numeral 58, designates a dash pot of a carbureter into the lower end of which is removably threaded a heater comprising a cylindrical casing 59, open at both ends and provided with a transverse partition wall 60, near the lower end thereof dividing the interior of the casing into a heating chamber and a gasolene chamber 61, which communicates with the dash pot chamber. Disposed within the heating chamber is a wire heat unit 62, surrounded by insulating material 63. The heating chamber is closed by means of a closure plate 64, held in position by a retaining screw 65, the inner end of which is removably threaded into the partition wall 60. The ends of the heat unit 62, are connected in circuit similar to the arrangement shown in the wiring diagram of Fig. 6. As clearly shown in Fig. 8, the casing 59, is provided with a threaded opening in one side thereof above the partition wall 60, and removably threaded into said opening is a thermostat similar to that already described and shown in Figs. 3, 4 and 5.

Fig. 10, shows a thermostat similar to that shown in Fig. 8, removably threaded into a threaded opening provided for the purpose in the exhaust manifold 66, of the engine 1.

A modified form of thermostat is shown in Fig. 11, and embraces an angle plate comprising integral plates 67 and 68. Rigidly secured or integrally formed on the outer surface of the plate 67, is a tube 69, the inner end of which is enlarged, as denoted by the reference numeral 70, and is externally threaded to permit mounting of the device by means of the nut 71, disposed adjacent the wall 67, and integral therewith. Slidably disposed within the tube 69, is an expansion rod 72, adapted, when expanded by heat, to contact a finger or pawl 73, pivotally mounted on the inner surface of the wall 68, to move the free end thereof against a contact member or lever 74, the upper end of which is pivoted upon the wall 68, while the lower end is free and is disposed between adjustable contact terminals 75 and 76, mounted upon an extension 77, formed below the plate 68.

The operation is as follows:

In Figs. 1 to 7, inclusive, the heater is connected in the gasolene supply pipe 4, adjacent the carbureter 3, and the thermostat is removably threaded into the outer casing 6, of the heater, thus connecting the chambers 13 and 24, by means of the passage 21. The solenoid switch is conveniently located on the dash 38, of the automobile, while the batteries 50, may be located in any convenient place desired. The various mechanisms of the device are connected up as shown on the wiring diagram shown in Fig. 6. When the engine 1, is cold, the expansion spring 29, is contracted, thus holding the contact member 30, against the contact terminal 31. If it is desired to start the engine, the gasolene is turned on and flows through the pipe 4, into the chambers 13 and 24, and into the float chamber of the carbureter. The solenoid coil 52, is then manually pulled outwardly by the handle 53, thus bringing the contact member 54, into contact with both of the contact terminals 43 and 44, thereby establishing a circuit through the batteries 50, the expansion spring 29, and the heat coil 18, through ground. The heat coil is thus rapidly heated by electricity thus heating the inner casing 11, and thereby the gasolene in the chamber 13. The heated gasolene, of course, flows into the thermostat chamber 24, heating the partition wall 23, and the expansion spring 29, which expands, thereby drawing the contact member 30, away from the terminal 31, and into contact with the terminal 32. This operation establishes a circuit through the solenoid coil 45, whereby the core 52, is automatically drawn inwardly, breaking the contact between the solenoid contact member 54, and the terminals 43 and 44, thus cutting the batteries out of circuit. The entering gasolene is thus rapidly heated before it is admitted into the mixing chamber of the carbureter, thus making it comparatively easy to start the engine.

It will be noted that when the engine is in operation or is warm, accidental closing of the contact member 54, against the terminals 43 and 44, will be immediately broken by the action of the solenoid, due to the fact that the contact member being heated is in contact with terminal 32. The heating of the entering gasolene when it is desired to start the engine when cold is therefore controlled by the thermostatic control mechanism described.

The operation of the modified form of the device shown in Figs. 8 and 9, is similar to that already described, the heating unit 62, having one terminal grounded and the other connected through the wire 36, to the terminal 31. In this case, however, the gasolene from the dash pot chamber flows into the chambers 61 and 24, to be heated before entering the mixing chamber of the carbureter.

In the arrangement shown in Fig. 10, the thermostat is connected in the exhaust manifold 66, of the engine, and the circuit connections are similar to the arrangement shown in Fig. 6.

The modified form of thermostat disclosed in Fig. 11, may, of course, be substituted for the form shown in the other figures. When the expansion rod 72, is cold or contracted, the pawl 73, is permitted to fall rearwardly against the plate 67, thus permitting the contact member 74, to swing against the contact terminal 76, to which the wire 36, is connected when the modified form of thermostat is used in place of the one shown in the wiring diagram. The contact terminal 75, is connected with the wire 46, and the contact member 74, is connected up with the wire 48. It will, of course, be understood that the threaded portion 70, is adapted to be threaded into an electric heater or into the exhaust manifold of an engine to afford a means for heating the tube 69, and consequently the expansion rod 72. The expansion rod 72, thus heated, expands and moves the pawl 73, against the contact member 74, which in turn is moved to contact the contact terminal 75, thus breaking the circuit through the heater, and establishing a circuit through the solenoid coil to automatically break the contact between the contact member 54, and the contact terminals 43 and 44, which contact was originally made by pulling the solenoid core 52, outwardly, to permit starting of the engine.

I am aware that numerous details of construction may be varied through a wide range without departing from the principles of this invention, and I therefore do not purpose limiting the patent granted otherwise than necessitated by the prior art.

I claim as my invention:

1. A thermostatically controlled heating system for fuel of a hydrocarbon engine comprising a heater for the fuel, a thermostat subjected to the heated fuel, electrical connections between said thermostat and heater whereby said thermostat is normally in circuit with the heater, a source of electrical energy, a switch in the main line of said source leading to the heater and thermostat, and a solenoid for operating said switch into open position, said solenoid connected to said source of energy and to a terminal in the thermostat whereby upon the breaking of the circuit to the heater by the thermostat, circuit is subsequently established through the solenoid to operate the switch to open position.

2. A thermostatically controlled heating system for fuel of a hydrocarbon engine comprising a source of electrical energy, a manually operable switch in the main line thereof, a heater connected to said main line, a thermostat having two terminals, one connected to said heater, a solenoid for operating said switch into open position when energized connected to the other terminal of the thermostat, and said heater and thermostat so associated as to impart the heat of the heated fuel to the thermostat to cause opening of the circuit to the heater and closure of the circuit to the solenoid by the thermostat to operate the switch into open position.

3. In a heating arrangement for hydrocarbon fuel of the class described for use on a motor car, a heater connected into the fuel supply, a thermostat associated therewith subject to the heat of the fuel heated, a source of electrical energy, one terminal thereof grounded, the other terminal thereof connected to said heater, a connection from said heater to one terminal of the thermostat, a manually operated switch, one terminal thereof connected to said source of electrical energy, the other terminal thereof connected to said thermostat, and a solenoid for operating said switch into open position, one terminal thereof grounded, and the other terminal connected to a terminal of the thermostat, whereby the thermostat upon heating, opens circuit to the heater and thereafter closes circuit to the solenoid to operate the switch into open position.

4. In a heating system for the fuel of a hydrocarbon engine, means for heating the fuel, a thermostatic element controlling the supply of energy to said means, a switch adapted to control supply of energy to said means, and mechanism controlled by the thermostat for opening said switch subsequent to the cutting off of supply of energy to said means by said thermostat.

5. The combination with a heater for heating fuel for a hydrocarbon engine of a thermostat subjected to the heated fuel, a source of energy for said heater, a switch manually operatable to close a circuit from the source of energy to said heater, a solenoid for operating said switch into open position, and a plurality of terminals on said thermostat, one in series with said heater, one in series with said solenoid, and the other connected to said switch, said thermostat operating automatically under influence of heat to open the circuit to the heater and subsequently thereafter to close circuit through the solenoid, causing operation of said switch into open position.

6. The combination with a gasolene engine, of a gasolene heater connected therewith, a solenoid switch mechanism, a thermostat disposed between said heater and solenoid switch mechanism, and a source of electrical energy adapted to be connected to said heater to heat the same when said solenoid switch mechanism is manually operated and be disconnected from said heater by the automatic operation of said thermostat and solenoid switch mechanism when a predetermined temperature has been reached by the gasolene passing through said heater.

7. In a device of the class described the combination with a gasolene supply line, of a casing connected therewith to permit gasolene to pass therethrough, a heater in said casing for heating the gasolene passing through said casing, an auxiliary casing mounted on said first casing and communicating with the interior thereof, a partition in said auxiliary casing dividing the same into a gasolene chamber and an instrument chamber, and a thermostat in said instrument chamber adapted to be heated by the heated gasolene flowing into said gasolene chamber to control the operation of said heater.

8. In a device of the class described the combination with a gasolene supply line, of a casing connected therewith to permit gasolene to pass therethrough, an electrical heater in said casing for heating the gasolene passing through said casing, an auxiliary casing mounted on said first casing and communicating with the interior thereof, a partition in said auxiliary casing dividing the same into a gasolene chamber and an instrument chamber, a thermostat in said instrument chamber normally in circuit with said heater adapted to be heated by the heated gasolene flowing into said gasolene chamber to control the operation of said heater, and an automatic switch mechanism for controlling the circuit to said heater and said thermostat.

In testimony whereof I have hereunto subscribed my name in the presence of two subscribing witnesses.

LEWIS H. LAMONT.

Witnesses:
 EARL M. HARDINE,
 CHARLES W. HILLS, Jr.